Sept. 3, 1968  E. P. COX  3,399,482

FISHHOOKS

Filed April 25, 1966

INVENTOR.
ERNEST P. COX
BY Dwight N. Mason
ATTORNEY.

3,399,482
FISHHOOKS
Ernest P. Cox, P.O. Box 451, Osburn, Idaho 83849
Filed Apr. 25, 1966, Ser. No. 544,943
5 Claims. (Cl. 43—15)

ABSTRACT OF THE DISCLOSURE

A resilient fishhook which has a normally curved piercing or bait end. The curved end is held in a substantially straight position under spring tension by a latch until a predetermined force is exerted on the trigger arm of the latch. This causes the latch to release the piercing end so that it quickly develops into a curve thereby automatically hooking a fish.

---

This invention relates to improvements in fishhooks and more particularly to a spring-type fishhook which will automatically hook or catch a fish that bites the hook or a lure associated with the hook.

An object of the invention is to provide a hand set and trigger-released spring hook which may be used as a baited hook or in conjunction with flies, plugs, spoons or other types of artificial lures.

Another important object is to provide a spring hook of the above-mentioned type which can be made in various sizes and whose strengths in these sizes will represent an accurate measurement in pounds of line pull required to straighten the hook and thereby release the fish. This feature will be a major benefit to sportsmen who wish to fish with a hook of known pounds pull for records and contests.

Another object is to provide a fishhook which is humane in that the fish can be released by holding the fish and pulling on the line. When the required pull is exerted to equal the strength of the hook, the hook will straighten and the fish can be easily released.

Another objective is to provide an automatic fishhook which is weedless and economical to use. For example, if the line and leader are of greater strength than the pull required to straighten the hook, it will be impossible to lose the line, leader or hook, if the fish is too big to land.

Other objects and advantages of the invention will become apparent during the course of the following detailed description.

In the accompanying drawings forming a part of this application and in which like numerals are employed to designate like parts throughout the same, FIGURE 1 is a side elevation of a fishhook embodying the invention and showing the same set or untriggered in full lines and triggered or released in broken lines;

Figure 1:
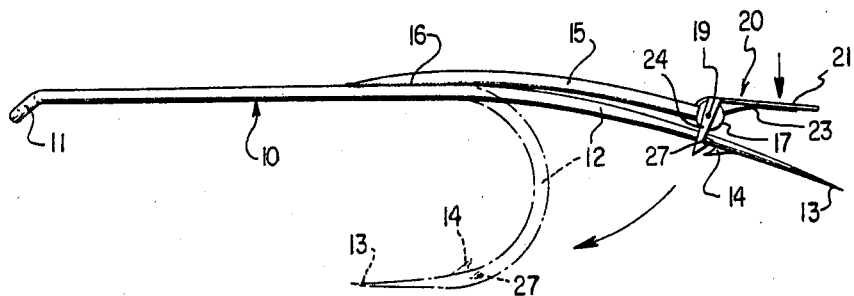
Figure 2:
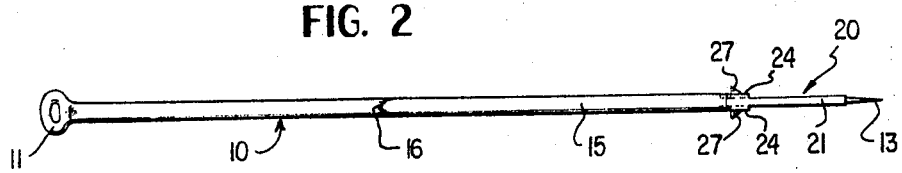
FIGURE 2 is a plan view of the invention.
Figure 3:
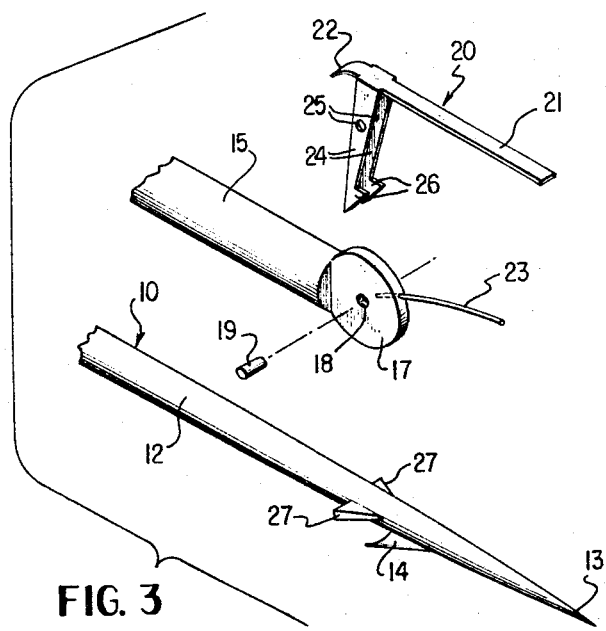
FIGURE 3 is an enlarged fragmentary exploded perspective view.

In the drawings, wherein for the purpose of illustration is shown a preferred embodiment of the invention, the numeral 10 designates a fishhook main shank having a line attaching eye 11 at its rear end and a gradually forwardly tapering gently curved forward extension 12 terminating in a sharp point 13 and having a barb 14 somewhat rearwardly of the point. The main shank 10 is formed of spring steel or the like and its tapering portion 12 is resilient and tensioned so that when in a free position or relaxed, it will assume the configuration of an ordinary fishhook, as shown in broken lines in FIGURE 1. At this time, the shank portion 12 will be substantially U-shaped and the point 13 will be rearwardly facing and spaced laterally from the main shank. Due to the resiliency of the material, the shank portion 12 may be straightened out manually to the slightly curved full line position, shown in FIGURE 1, which is the set position, to be further described. In this set position, the main shank portion 12 is substantially straight in the region between the barb 14 and the point 13.

The numeral 15 designates a stiff trigger mounting arm of lesser length than the main shank and having its rear end portion securely bonded to the main shank intermediate the ends of the latter by welding or the like as indicated at 16. The arm 15 is much more rigid than the main shank and may be formed of harder steel to resist bending. Adjacent the curved extension 12 of the main shank, the arm 15 is unattached to the main shank and terminates at its forward end in a flat disc head 17 which lies near the barb 14, as shown in FIGURE 1. The disc head 17 has a transverse opening 18 for the reception of a pivot pin 19 which serves to pivotally mount a generally L-shaped trigger 20 upon the forward end of arm 15.

The trigger 20 includes a longitudinal release extension or bar 21 which is struck by the fish when the fish takes the hook and an integral curved stop extension 22 at the rear end of the trigger limits the counter-clockwise movement of the trigger on the axis of pin 19 under the influence of a hair spring 23 seated within a small opening of the head 17 and bearing against the underside of release extension 21, as shown. The trigger 20 further includes a pair of laterally spaced hooks 24 which straddle the head 17 and have openings 25 formed therethrough to receive the pin 19 pivotally. The locking heads 26 on the lower ends of trigger hooks 24 coact with a pair of detent lugs 27 mounted on opposite sides of the main shank just rearwardly of the barb 14. The lugs 27 may also serve as additional barbs on the hook.

The use or operation of the hook is as follows:

The main shank of the hook may be easily straightened by hand to the set position shown in FIGURE 1, wherein the lugs 27 will snap into locked engagement with the locking heads 26 of the trigger. The trigger mounting arm 15 is stiff enough to hold the main shank portion 12 in the generally straight condition as shown. When the fish strikes the hook, the release extension 21 will be engaged and a rather slight pressure thereon will pivot the trigger 20 clockwise and release the lugs 27 and the main shank will instantly recoil to the broken line position shown in FIGURE 1, with the advantages in catching the fish already discussed. The axis of the pivot pin 19 is in alignment substantially with the locking heads 26 so as to provide a slightly over dead center relationship of the parts. This allows the spring hook to be securely set or cocked and also allows it to be released or sprung without the necessity for excessive pressure on the trigger. The construction is simple and sturdy and the advantages of the invention should now be apparent to those skilled in the art, without the necessity for any further description herein.

I claim:

1. A fishhook comprising a spring shank body portion which is tensioned to normally assume a fishhook configuration when relaxed and adapted to be straightened substantially by bending, and trigger release means bodily mounted upon said body portion and including a pivotally movable trigger element engageable with the spring shank body portion to secure the same releasably in said straightened position.

2. The invention as defined by claim 1, and wherein the trigger release means comprises a relatively rigid trigger mounting arm secured to one side of said body portion, and lug means on said body portion near said arm, said pivoted trigger element being mounted on said arm and including detent hook means directly engageable with the lug means for holding the body portion in a generally straight set position.

3. The invention as defined by claim 2, and wherein said pivoted trigger element is generally L-shaped including a release extension projecting generally longitudinally of said arm and a portion projecting generally at right angles to said detent hook means.

4. A fishhook structure comprising a highly resilient barbed spring shank body portion which is tensioned to normally assume a conventional fishhook shape when relaxed and adapted to be deformed manually to a generally straight configuration, a relatively rigid arm fixedly secured near one end to an intermediate portion of said body portion and being partially coextensive with the body portion and unattached thereto except at said one end, said arm being stiff enough to resist the spring tension of the body portion without bending appreciably when the body portion is straightened and connected with said arm, and fish-engageable trigger release means carried by said arm and engageable with said body portion to releasably hold the same in a straightened position.

5. The invention as defined by claim 4, and laterally projecting detent lug means on said spring shank body portion engageable with said trigger release means, said release means including a hook element to directly engage the lug means.

References Cited

UNITED STATES PATENTS 2,865,131  12/1958  Ellis _____ 43—43.16

WARNER H. CAMP, *Primary Examiner.*